United States Patent [19]

Frois

[11] 4,244,130
[45] Jan. 13, 1981

[54] ANIMATED DISPLAY SIGN

[75] Inventor: Mauricio Frois, New York, N.Y.

[73] Assignee: Thomson-Leeds Company, Inc., New York, N.Y.

[21] Appl. No.: 4,458

[22] Filed: Jan. 18, 1979

[51] Int. Cl.³ .............................................. G09F 13/18
[52] U.S. Cl. ...................................... 40/442; 40/546; 40/615
[58] Field of Search ................... 40/546, 442, 444, 615

[56] References Cited
U.S. PATENT DOCUMENTS

| | | | |
|---|---|---|---|
| 2,140,301 | 12/1938 | Regester | 40/546 X |
| 2,170,641 | 8/1939 | Lancelot | 40/546 X |
| 2,722,762 | 8/1955 | Krajian | 40/546 |
| 3,662,381 | 5/1972 | Steffens | 40/444 |
| 3,748,769 | 7/1973 | Nolles | 40/546 X |
| 3,968,584 | 7/1976 | Kingston | 40/546 |

Primary Examiner—Gene Mancene
Assistant Examiner—G. Lee Skillington
Attorney, Agent, or Firm—Howard C. Miskin

[57] ABSTRACT

A display device includes a hollow base having a slot in its top wall and a bottle simulating transparent shell has its rear opening covered by a plurality of superimposed transparent sheets having relatively vertically staggered, translucent faced dimples formed in their rear faces, their lower border interfaces opaque with these lower borders engaging the slot and the remaining borders opaque. A longitudinally slotted hollow cylinder is motor rotated in the base and a lamp is located in the cylinder so that the bottom edges of the sheets are cyclically successively illuminated whereby the light dispersing dimples provide the illusion of rising bubbles in the bottle.

8 Claims, 3 Drawing Figures

U.S. Patent  Jan. 13, 1981  Sheet 2 of 2  4,244,130 ent sheets having formed successively in their rear faces recesses corresponding to the sequential positions of an object which is to be animated and corresponding end edges of the sheet are successively individually illuminated so as to visualize the sequential positions of the animated object. The animated effect is achieved only to a limited degree since the presentation has a flat unreal appearance with no great attraction and is thus of little versatility and adaptability.

ANIMATED DISPLAY SIGN

BACKGROUND OF THE INVENTION

The present invention relates generally to improvements in display devices and it relates particularly to an improved illuminated animated display device.

Many forms of light animated display devices have heretofore been employed and proposed and while for some purposes they offer many advantages for other purposes they possess numerous drawbacks and disadvantages. A known type of light aminated display device includes a plurality of superimposed flat transparent sheets having formed successively in their rear faces recesses corresponding to the sequential positions of an object which is to be animated and corresponding end edges of the sheet are successively individually illuminated so as to visualize the sequential positions of the animated object. The animated effect is achieved only to a limited degree since the presentation has a flat unreal appearance with no great attraction and is thus of little versatility and adaptability.

SUMMARY OF THE INVENTION

It is the principal object of the present invention to provide an improved display device.

Another object of the present invention is to provide an improved animated display device.

Still another object of the present invention is to provide an improved light animated display device.

A further object of the present invention is to provide an improved display device simulating a bottle containing a carbonated beverage with rising bubbles.

Still a further object of the present invention is to provide a display device of the above nature characterized by its attractive and realistic appearance, its simplicity, reliability, low cost and high versatility and adaptability.

The above and other objects of the present invention will become apparent from a reading of the following description taken in conjunction with the accompanying drawings which illustrate a preferred embodiment thereof.

In a sense the present invention contemplates the provision of an improved light animated display device which comprises a three-dimensional contoured transparent body member having along the rear thereof a plurality of superimposed transparent sheets having recesses in their rear faces which are staggered relative to those in the other sheets, and means for cyclically successively illuminated the corresponding end edges of the sheets to provide an illusion of longitudinal movement of the illuminated recesses in the body member.

In accordance with the preferred embodiment of the present invention of the body member is a bottle simulating shell closed at its open rear by the superimposed sheets the lower borders of the sheets being laterally enlarged and opaque foil being sandwiched between the lower border confronting faces. The recesses are concave dimples with opaque faces and the lower borders of the assembled sheets and body project through a slot in the top wall of a hollow base. Housed in the base is a motor driven hollow cylinder directly below the sheets and having circumferentially spaced slots and a lamp is located within the cylinder so as to successively illuminate the sheet bottom edges.

The improved display device provides the complete illusion of a bottle containing a carbonated beverage with rising bubbles and is inexpensive, highly attractive, rugged and of great versatility and adaptability.

DESCRIPTION OF THE PREFERRED EMBODIMENT

Figure 1:
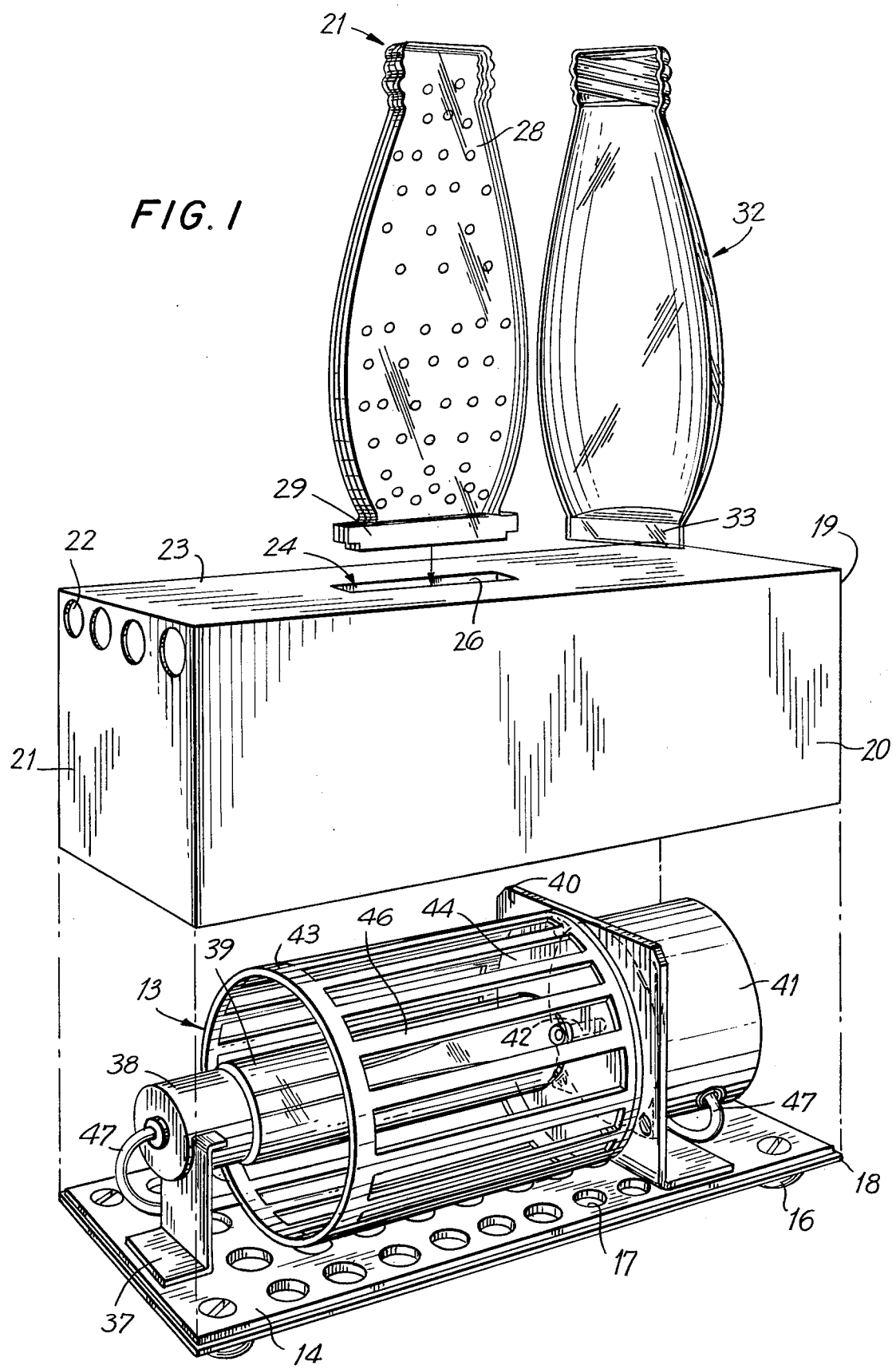
FIG. 1 is a partially exploded perspective view of a display device embodying the present invention.

Referring now to the drawings which illustrate a preferred embodiment of the present invention, the reference numeral 10 generally designates the improved display device which includes a hollow base portion 11 and an upper display portion 12 which houses an animating illuminating portion 13.

The base portion 11 includes a rectangular base plate 14 mounted on rubber foot pieces 16 located at the corners of base plate 14 and having formed therein vent openings 17. Base plate 14 includes a horizontal peripheral flange 18 and a rectangular cover or shell member 19 has a bottom opening engaging base plate 14 and a rectangular bottom peripheral edge resting on flange 18. The cover member 19 includes rectangular front and real walls 20 and square end walls 21 having vent openings 22 in their upper borders and a horizontal rectangular top wall 23. Centrally formed in top wall 23 is a longitudinal slot 24 having a depending peripheral flange 26 along the edges thereof.

The display portion 12 comprises a light-animated assembly 27 of superimposed similarly shaped flat transparent sheets 28 which are preferably clear and colorless and are advantageously formed of a clear, thermoplastic resin of high light conductivity such as the acrylic plastics. In the illustrated embodiment each sheet 28 includes a main upper portion of the shape of the longitudinal cross section of a bottle and a lower laterally enlarged rectangular portion 29 of the length of slot 24 and of the height of flange 26. An opaque strip 30, such as of metallic foil, is sandwiched between each pair of confronting faces of sheet lower portions 29 and a strip 30 is likewise disposed along the front and rear faces of the lower portions 29 of the assembled sheets, the strips 30 being replacable by suitable opaque coatings on the corresponding faces of sheet lower portions 29. The peripheral edges, except for the downwardly facing bottom edges of sheets 28 are likewise coated or otherwise overlaid with an opaque layer.

The display portion 12 also includes a body member 32 simulating a half of a bottle split along a vertical medial plane. The body member 32 is an open backed hollow shell formed of a transparent, preferably clear material, such as a thermoplastic resin and is advantageously vacuum or pressure thermoformed in the known manner from thermoplastic sheet and may be decorated or labeled as desired. The rear peripheral edge of body member 32 engages the front peripheral edge of the assembed sheets 28 and a rectangular panel 33 depends from body member 32 and overlies and coincides with the front face of the front lower section 29. Formed in the rear face of each sheet 28 are vertically spaced rows of horizontally spaced small concave recesses or dimples 34 whose faces may be translucent or rendered opaque in any suitable manner so that the interfaces thereof with the sheets, per se, are highly reflective or light dispersive. While the dimples 34 are illustrated as being linearly horizontally and vertically spaced, they may be nonlinearly vertically and horizontally spaced. In any event the dimples 34 in each sheet 28 are somewhat higher than the corresponding dimples in the next successively forward sheet with those in the front sheet 28 being somewhat higher than those in the rear sheet 28. Moreover, while three superimposed sheets 28 are illustrated, two or more sheets may be employed.

The assembled front body member 32 and superimposed stack of sheets 28 are vertically supported by cover top wall 23 with the superimposed body panel 33 and sheet bottom panels 33 matingly engaging slot 24 and tightly sandwiched and clamped between the opposite longitudinal legs of peripheral flange 26 so that the sheet bottom edges 36 are exposed to the interior of the base 11 and face downwardly.

Medially mounted on base plate 14 proximate one end thereof is a first bracket 37 which mounting a lamp socket 38 which supports a longitudinally extending low power elongated electric lamp 39 and medially mounted on base plate 14 inwardly of the opposite end thereof is a motor mounting bracket 40. Supported by bracket 40 is a horizontal low speed motor 41, for example 12 RPM, having a longitudinal drive shaft 42 coaxial with lamp 39. Secured to shaft 42 and rotatable therewith is a hollow masking cylinder 43 open at the end thereof proximate socket 38 and surrounding coaxial lamp 39 and having its upper face proximate the sheet bottom edges 36.

Formed in the peripheral wall of cylinder 43 are peripherally regularly spaced longitudinal slots which extend for the full length of slot 24 and are each of a width advantageously of the order of about two to three times the width of a sheet 28 and the bars 45 separating the successive slots 44 are about half of the width of slot 44. As an example, sheets 28 are 0.10 inch thick, the widths of slots 44 and bars 45 are 0.25 and 0.125 inch respectively and the cylinder 43 is 3.0 inches long and 2.0 inches in diameter and formed of an opaque plastic. Motor 41 and lamp socket 38 are connected by leads 47 and are connected to a suitable electric power cable terminating in a coupling plug.

Figure 2:
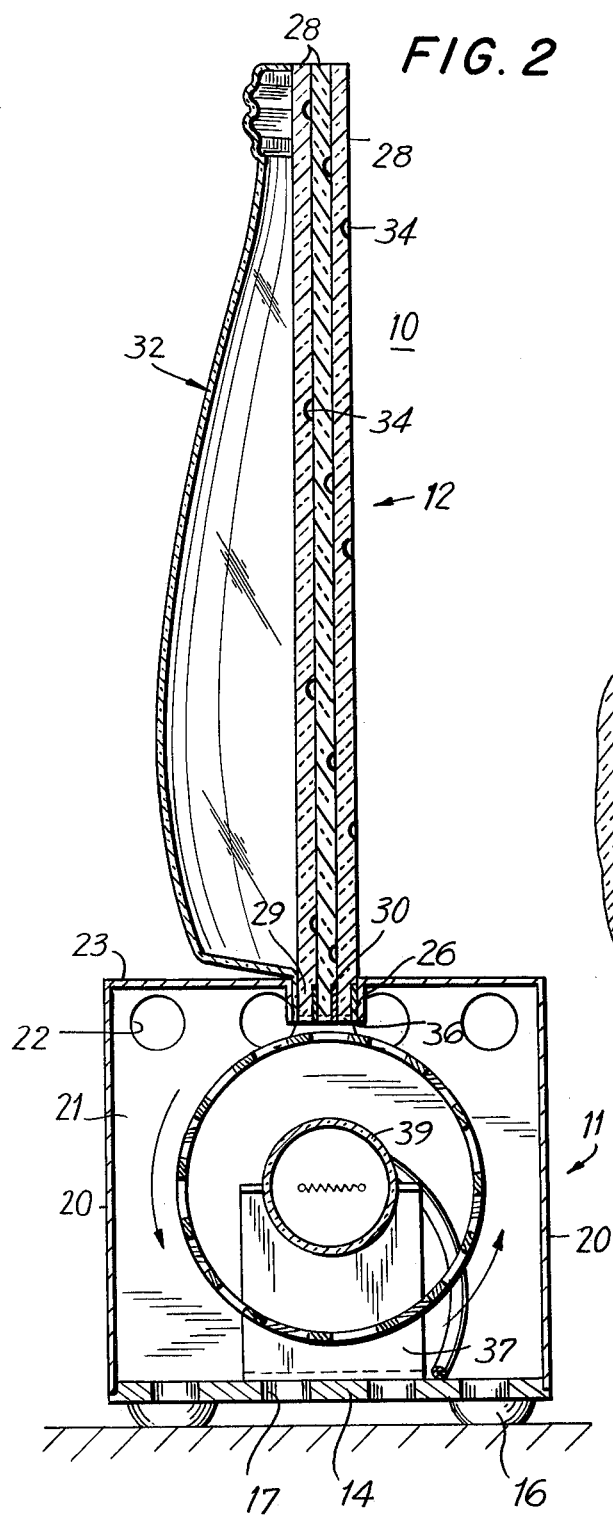
FIG. 2 is a vertical medial transverse sectional view of the assembled device.
Figure 3:
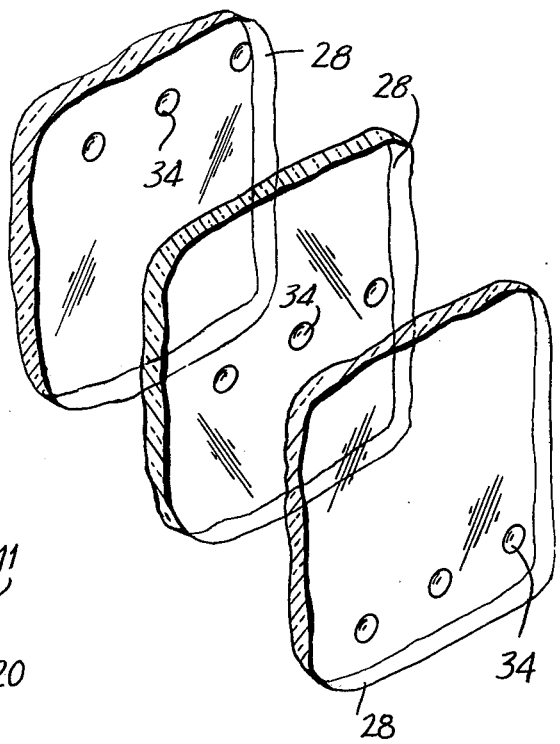
FIG. 3 is a fragmentary exploded perspective view of the rising bubble simulating sheets.

In the operation of the improved display device the cylinder 43 is rotated counter clockwise in the direction of the arrow as viewed in FIG. 2, by the electrically energized motor 41 to successively sequentially expose sheet edges 36 from the front to the rear to lamp 39 to sequentially corresponding illuminate the successive sheets 28 and darken the trailing successive sheets. The light conducted by an illuminated sheet renders the faces of the dimples therein brightly visible by reason of the light reflective and dispersing interfaces thereof with the sheet substrate to give them the appearance of bubbles located in a liquid in bottle 32. As successive sheets are illuminated with the trailing sheet darkened the dimples in successive sheets are sequentially rendered visible at higher levels assuming the appearance of bubbles which appear to be rising within a bottle containing liquid. The opaque partitions 30 function to delineate the light passages in the separate sheets so as to minimize the illumination of a sheet 18 unexposed to lamp 39 by the light received by an adjacent sheet.

While there has been described and illustrated a preferred embodiment of the present invention, it is apparent that numerous alterations, omissions and additions may be made without departing from the spirit thereof.

I claim:

1. A display device comprising a plurality of superimposed transparent sheets each having formed in the rear face thereof a plurality of vertically and transversely spaced individual concave dimples which are vertically staggered relative to corresponding dimples in the other sheets, a three-dimensional contoured transparent body member simulating a liquid receptacle disposed forwardly of and adjacent to said sheets and including a hollow shell having a convex front face and a concave rear face, the border of the forwardmost sheet overlying the perimeter of said shell and illuminating means for cyclically sequentially illuminating corresponding adjacent edges of said sheets whereby to cyclically sequentially illuminate the dimples in successive sheets and provide an illusion of rising bubbles in said liquid receptacle simulating body member.

2. The display device of claim 1 wherein the concave faces of said dimples are relatively opaque.

3. The display device of claim 2 including opaque partitions interposed between confronting borders of said sheets proximate the illuminated end edges thereof.

4. The display device of claim 1 wherein said illumination means includes a source of illumination and means for cyclically sequentially exposing successive adjacent corresponding edges of said sheets to said source of illumination.

5. The display device of claim 4 including a hollow base member having a top wall with a slot therein, the bottom border of said body members and sheets and said partition projecting through said slot said source of illumination and said sequential exposing means being housed in said hollow base member.

6. The display device of claim 5 wherein said sequential exposing means includes a hollow cylinder disposed directly below and extending along the lengths of said sheet end edges and having circumferentially spaced longitudinal slots formed therein and a motor rotating said cylinder about its axis and said source of illumination is disposed within said cylinder.

7. The display device of claim 6 wherein the widths of said slots are each equal to between the width of one and two of said sheets.

8. The display device of claim 4 wherein said exposure means always exposes at least one of said sheet end edges to said source of illumination.

* * * * *